United States Patent
Cohen

(10) Patent No.: US 9,870,357 B2
(45) Date of Patent: Jan. 16, 2018

(54) TECHNIQUES FOR TRANSLATING TEXT VIA WEARABLE COMPUTING DEVICE

(71) Applicant: Microsoft Technology Licensing, LLC, Redmond, WA (US)

(72) Inventor: Tomer Cohen, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 308 days.

(21) Appl. No.: 14/065,324

(22) Filed: Oct. 28, 2013

(65) Prior Publication Data

US 2015/0120279 A1 Apr. 30, 2015

(51) Int. Cl.
G06F 17/28 (2006.01)
G02B 27/01 (2006.01)
G06F 3/0481 (2013.01)

(52) U.S. Cl.
CPC ......... G06F 17/289 (2013.01); G02B 27/017 (2013.01); G06F 3/04812 (2013.01); G02B 2027/0178 (2013.01)

(58) Field of Classification Search
USPC ........... 704/1, 2, 8–10, 270–270.1, 275–277, 704/E13.011
See application file for complete search history.

(56) References Cited

U.S. PATENT DOCUMENTS

| | | | |
|---|---|---|---|
| 5,715,466 A * | 2/1998 | Flanagan et al. | 704/5 |
| 6,205,418 B1 * | 3/2001 | Li | G06F 17/289 704/8 |
| 6,240,392 B1 * | 5/2001 | Butnaru et al. | 704/271 |
| 6,415,250 B1 * | 7/2002 | van den Akker | 704/9 |
| 7,117,223 B2 * | 10/2006 | Koizumi et al. | |
| 7,137,070 B2 * | 11/2006 | Brown et al. | 715/744 |
| 8,027,438 B2 * | 9/2011 | Daigle | G06F 17/275 379/88.06 |
| 8,271,260 B2 * | 9/2012 | Wong | G06F 17/28 704/2 |
| 2001/0029455 A1 * | 10/2001 | Chin et al. | 704/277 |
| 2001/0056342 A1 * | 12/2001 | Piehn et al. | 704/3 |
| 2002/0036617 A1 * | 3/2002 | Pryor | 345/156 |
| 2002/0042790 A1 * | 4/2002 | Nagahara | G06F 17/30899 |
| 2002/0103649 A1 * | 8/2002 | Basson et al. | 704/270 |
| 2004/0030540 A1 * | 2/2004 | Ovil et al. | 704/1 |
| 2004/0102956 A1 * | 5/2004 | Levin | 704/2 |
| 2004/0210444 A1 * | 10/2004 | Arenburg | G06F 17/275 704/277 |
| 2005/0010418 A1 * | 1/2005 | McNair et al. | 704/275 |
| 2005/0086051 A1 * | 4/2005 | Brulle-Drews | 704/7 |
| 2005/0288932 A1 * | 12/2005 | Kurzweil | G06K 9/00993 704/260 |
| 2006/0100849 A1 * | 5/2006 | Chan | G06F 17/241 704/8 |
| 2008/0233980 A1 * | 9/2008 | Englund et al. | 455/466 |

(Continued)

*Primary Examiner* — Paras D Shah
*Assistant Examiner* — Jonathan Kim
(74) *Attorney, Agent, or Firm* — Schwegman Lundberg & Woessner, P.A.

(57) ABSTRACT

A method of presenting translated content items is disclosed. It is detected that a content item has been captured by a device of a user. It is identified that the content item is a candidate content item for translation. The candidate content item is translated; and the translated candidate content item is presented via a user interface of a wearable display of the device.

17 Claims, 7 Drawing Sheets

(56) References Cited

U.S. PATENT DOCUMENTS

| | | | |
|---|---|---|---|
| 2008/0243473 A1* | 10/2008 | Boyd | G06F 17/28 704/2 |
| 2009/0024595 A1* | 1/2009 | Chen | G06F 17/30864 |
| 2009/0048821 A1* | 2/2009 | Yam et al. | 704/3 |
| 2009/0099836 A1* | 4/2009 | Jacobsen | G06F 17/289 704/3 |
| 2009/0306959 A1* | 12/2009 | Rappoport | G09B 7/02 704/2 |
| 2009/0316951 A1* | 12/2009 | Soderstrom | G06F 17/30241 382/103 |
| 2011/0098029 A1* | 4/2011 | Rhoads | G01C 21/3629 455/418 |
| 2011/0098056 A1* | 4/2011 | Rhoads | G01C 21/20 455/456.1 |
| 2011/0161076 A1* | 6/2011 | Davis | G06F 3/04842 704/231 |
| 2011/0307241 A1* | 12/2011 | Waibel et al. | 704/2 |
| 2012/0069131 A1* | 3/2012 | Abelow | 348/14.01 |
| 2012/0075168 A1* | 3/2012 | Osterhout et al. | 345/8 |
| 2012/0105719 A1* | 5/2012 | Fratti et al. | 348/462 |
| 2012/0316860 A1* | 12/2012 | Reitan | 704/2 |
| 2012/0317046 A1* | 12/2012 | Myslinski | G06Q 30/02 705/329 |
| 2013/0090915 A1* | 4/2013 | Clark | G06F 17/28 704/2 |
| 2013/0124186 A1* | 5/2013 | Donabedian | G06F 17/289 704/2 |
| 2013/0246039 A1* | 9/2013 | Duneau | G09G 5/40 |
| 2013/0293577 A1* | 11/2013 | Perez | G02B 27/017 345/633 |
| 2013/0297284 A1* | 11/2013 | Choi | G06F 17/28 704/2 |
| 2013/0332143 A1* | 12/2013 | Leszczenski | G06F 17/2836 704/2 |
| 2014/0006929 A1* | 1/2014 | Swartz | G06F 3/0237 715/234 |
| 2014/0335483 A1* | 11/2014 | Buryak | G06Q 50/01 434/167 |
| 2014/0337425 A1* | 11/2014 | Buryak | H04L 67/22 709/204 |
| 2015/0127325 A1* | 5/2015 | Birnbaum | G06F 17/274 704/9 |
| 2015/0161227 A1* | 6/2015 | Buryak | G06F 9/4448 707/738 |

* cited by examiner

TECHNIQUES FOR TRANSLATING TEXT VIA WEARABLE COMPUTING DEVICE

TECHNICAL FIELD

This application relates generally to the technical field of implementing user interfaces, and, in one specific example, to implementing a user interface that manages presentation on a wearable computing device of translations or definitions of content items being consumed (e.g., viewed or listened to) by a user.

BACKGROUND

Occasionally a user may seek a translation for or a definition of a content item that the user is consuming—for example, text that a user is viewing, or speech that a user is hearing. For example, a user may seek a translation for or a definition of a word or phrase that is on a menu where the user is dining, a word or phrase in a technical document at a conference that the user is attending, or a word or phrase that the user hears being uttered (e.g., by a person in the user's vicinity or via a media broadcast).

In these cases, to request the translation or definition, the user may access an application executing on a mobile device of the user. For example, the user may access a web browser application executing on a smartphone (e.g., an iPhone® or Android® device) or a laptop computer and navigate to a website that is configured to provide translations or definitions. Or the user may start another application on the device (e.g., a native application) that is configured to provide translations or definitions. After inputting the word or phrase, the user may then receive the translation or definition.

This process of retrieving translations or definitions may be cumbersome to the user. Furthermore, the translations or definitions may depend on the user's accuracy in inputting the word or phrase that is to be translated.

BRIEF DESCRIPTION OF THE DRAWINGS

Some embodiments are illustrated by way of example and not limitation in the figures of the accompanying drawings in which.

DETAILED DESCRIPTION

In the following description, for purposes of explanation, numerous specific details are set forth in order to provide an understanding of various embodiments of the inventive subject matter. It will be evident, however, to those skilled in the art that embodiments may be practiced without these specific details. Further, to avoid obscuring the inventive concepts in unnecessary detail, well-known instruction instances, protocols, structures, and techniques have not been shown in detail. As used herein, the term "or" may be construed in an inclusive or exclusive sense, the term "user" may be construed to include a person or a machine, and the term "interface" may be construed to include an application program interface (API) or a user interface.

Consistent with one aspect of the inventive subject matter, a method of presenting translated content items is disclosed. A wearable computing device receives or senses content items (e.g., text or audio). The wearable computing device identifies that one or more of the content items are candidates for translation. The wearable computing device manages translation of the one or more of the content items. The one or more translated content items are presented via a user interface of the wearable computing device.

This method and other methods or embodiments disclosed herein may be implemented as a computer system having one or more modules (e.g., hardware modules or software modules). Such modules may be executed by one or more processors of the computer system. This method and other methods or embodiments disclosed herein may be embodied as instructions stored on a machine-readable medium that, when executed by one or more processors, cause the one or more processors to perform the instructions.

Figure 1:
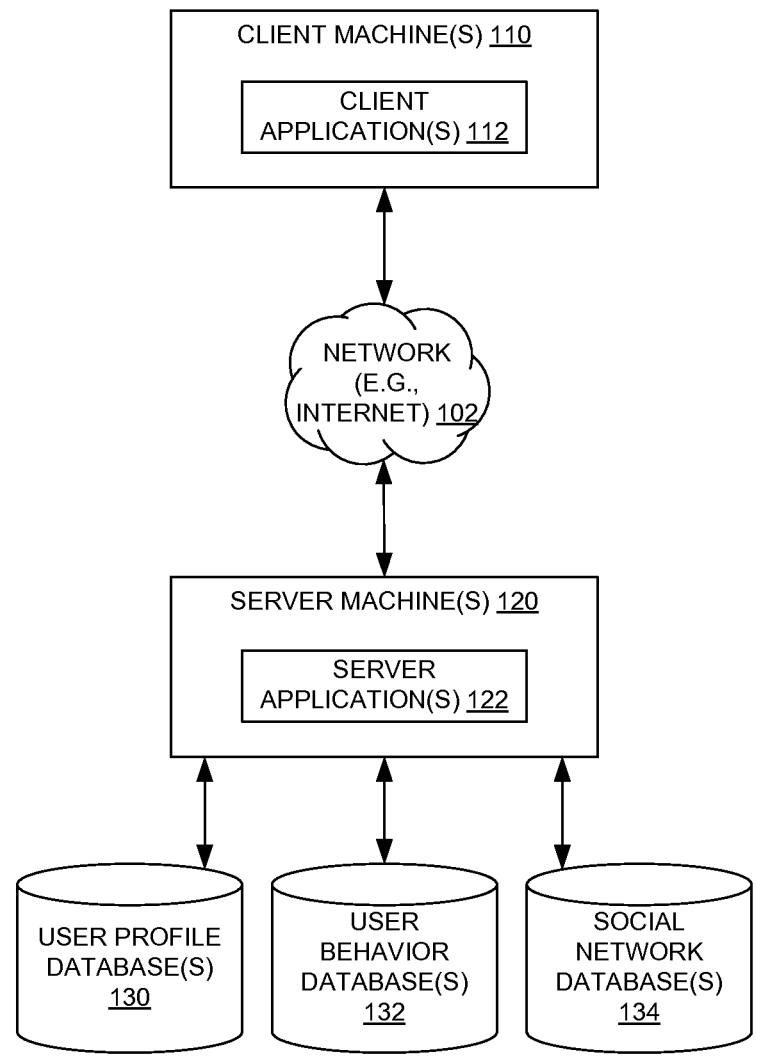
FIG. 1 is a network diagram depicting a system within which various example embodiments may be deployed.

FIG. 1 is a network diagram depicting a system 100, within which various example embodiments may be deployed. The system 100 includes server machine(s) 120. Server application(s) 122 may provide server-side functionality (e.g., via a network 102) to one or more client application(s) 112 executing on one or more client machine(s) 110. Examples of client machine(s) 110 may include mobile devices, including wearable computing devices. A mobile device may be any device that is capable of being carried around. Examples of mobile devices include a laptop computer, a tablet computer (e.g., an iPad), a mobile or smart phone (e.g., an iPhone), and so on. A wearable computing device may be any computing device that may be worn. Examples of wearable computing devices include a smartwatch (e.g., a Pebble E-Paper Watch), an augmented reality head-mounted display (e.g., Google Glass), and so on. Such devices may use natural language recognition to support hands-free operation by a user.

In various embodiments, the server machine(s) 120 may implement a social networking system. The social networking system may allow users to build social networks by, for example, by declaring or acknowledging relationships and sharing ideas, pictures, posts, activities, events, or interests with people in their social networks. Examples of such social networks include LinkedIn and Facebook.

In various embodiments, the client application(s) may include a web browser (e.g., a browser, such as the Internet Explorer browser developed by Microsoft Corporation of Redmond, Wash.), a native application (e.g., an application supported by an operating system of the device, such as Android, Windows, or iOS), or other application. Each of the one or more clients may include a module (e.g., a plug-in, add-in, or macro) that adds a specific service or feature to a larger system. In various embodiments, the network 102 includes one or more of the Internet, a Wide Area Network (WAN), or a Local Area Network (LAN).

The server applications 122 may include an API server or a web server configured to provide programmatic and web interfaces, respectively, to one or more application servers. The application servers may host the one or more server application(s) 122. The application server may, in turn, be coupled to one or more data services and/or databases servers that facilitate access to one or more databases or NoSQL or non-relational data stores. Such databases or data stores may include user profile database(s) 130, user behavior database(s) 132, or social network database(s) 134. In various embodiments, the user profile database(s) 130 include information about users of the social networking system.

In various embodiments, the user profile database(s) 130 include information about a user maintained with respect to a social networking system implemented by the server application(s) 122 executing on the server machine(s) 120. For example, the user profile database(s) 130 may include data items pertaining to the user's name, employment history (e.g., titles, employers, and so on) educational background (e.g., universities attended, degrees attained, and so on), skills, expertise, endorsements, interests, and so on. This information may have been specified by the user or collected from information sources separate from the user.

The user behavior database(s) 132 may include information pertaining to behaviors of the user with respect to the social networking system. For example, the user behavior database(s) 132 may include data items pertaining to actions performed by the user with respect to the system. Examples of such actions may include accesses of the system by the user (e.g., log ins and log outs), postings made by the user, pages viewed by the user, endorsements made by the user, likings of postings of other users, messages sent to other users or received by the user, declarations of relationships between the user and other users (e.g., requests to connect to other users or become a follower of other users), acknowledgements of declarations of relationships specified by the other users (e.g., acceptance of a request to connect), endorsements made by the user, and so on.

The social network database(s) 134 may include information pertaining to social networks maintained with respect to the social networking system. For example, the social network database(s) 134 may include data items pertaining to relationships between users or other entities (e.g., corporations, schools, and so on) of the social networking system. For example, the data items may describe declared or acknowledged relationships between any combination of users or entities of the social networking system.

The server application(s) 122 may provide a number of functions and services to users who access the sever machine(s) 120. While the server application(s) 122 are shown in FIG. 1 to be included on the server machine(s) 120, in alternative embodiments, the server application(s) 210 may form part of a service that is separate and distinct from the server machine(s) 120.

Further, while the system 100 shown in FIG. 1 employs a client-server architecture, various embodiments are, of course, not limited to such an architecture, and could equally well find application in a distributed, or peer-to-peer, architecture system, for example. The various applications could also be implemented as standalone software programs, which do not necessarily have computer networking capabilities. Additionally, although not shown in FIG. 1, it will be readily apparent to one skilled in the art that client machine(s) 110 and server machine(s) 120 may be coupled to multiple additional networked systems.

Figure 2A:
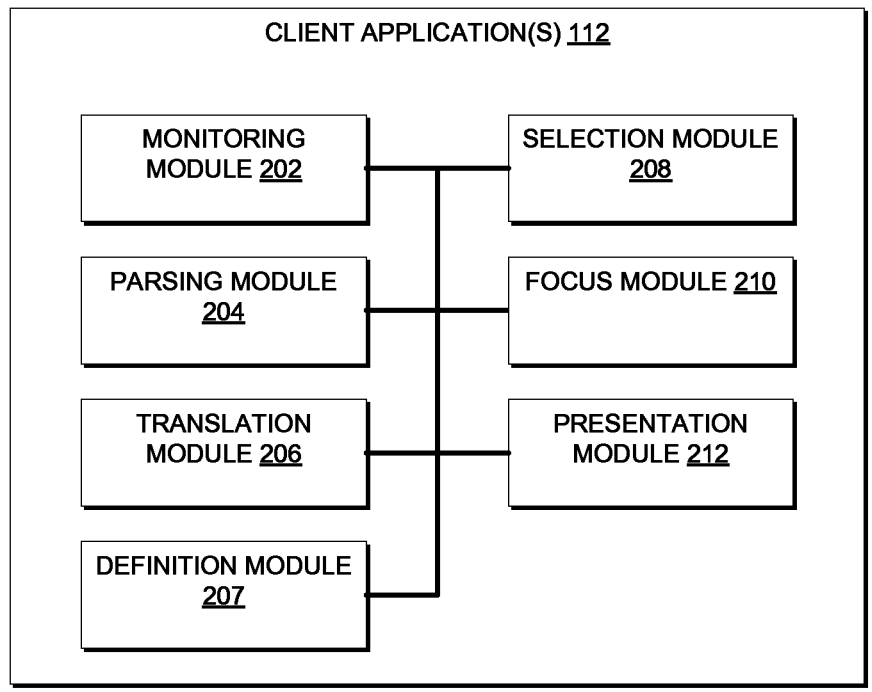
FIG. 2A is a block diagram illustrating example modules of the client application(s) of FIG. 1.

FIG. 2A is a block diagram illustrating example modules of the client application(s) 112. A monitoring module 202 may monitor activities of the user with respect to a client device. For example, the monitoring module 202 may determine that a user is viewing a content item through a display (e.g., a head-mounted display), a lens, or other input/output device or sensor of the client device (e.g., based on eye movements of the user). A parsing module 204 may recognize content items received from a content source (e.g., via a sensor of the device) as a candidate content items for defining or translating. For example, the parsing module 204 may identify that text in an image or sounds in audio captured by the device may be or include a candidate for translation, as described in more detail below. A translation module 206 may translate the candidate content item into a different language. For example, the translation module 206 may communicate with a processing module 254 to receive a translation of the content item. A definition module 207 may be configured to define the candidate content item. For example, the definition module 207 may communicate with a processing module 254 to receive a definition of the content item. In various embodiments, the translating or defining may be performed by the server application(s) 122 instead of or in combination with the client application(s) 112. A selection module 208 may select a stream of a set of content streams for translating or defining. Or the selection module 208 may select particular content items sensed or received from a content source for translating or defining. A focus module 210 may determine whether a content item is being focused on by the user (e.g., based on a location or orientation of the device relative to the content item). A presentation module 212 may present translated or defined content items (e.g., via a user interface of the device).

Figure 2B:
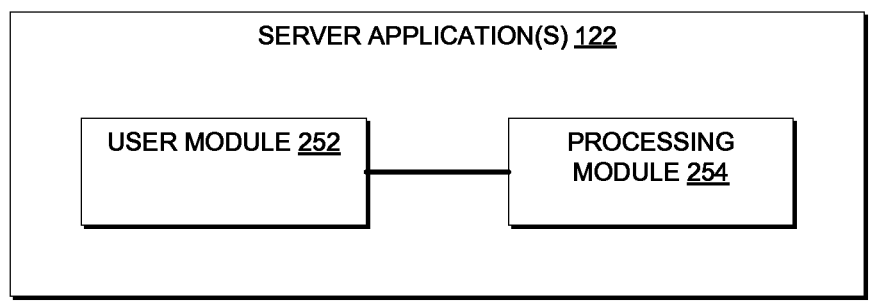
FIG. 2B is a block diagram illustrating example modules of the server application(s) of FIG. 1.

FIG. 2B is a block diagram illustrating example modules of the server application(s) 122 of FIG. 1. A user module 252 may determine information about users, such as levels of familiarity that a user has with various languages. For example, the user module 252 may query the databases 130, 132, or 134 to determine information about the users pertaining to their fluency in the various languages. A processing module 254 may perform translating or defining of content items or assist the translation module 206 or definition module 207 in determining translations or definitions of content items. In various embodiments, the translating or defining may be performed by the server application(s) 122, the client application(s) 112, or a combination of such applications. In various embodiments, a user may specify a preference for a language to which content in another language is to be translated by default. This preference may be stored in a profile of the user that is maintained with respect to the social networking system.

Figure 3:
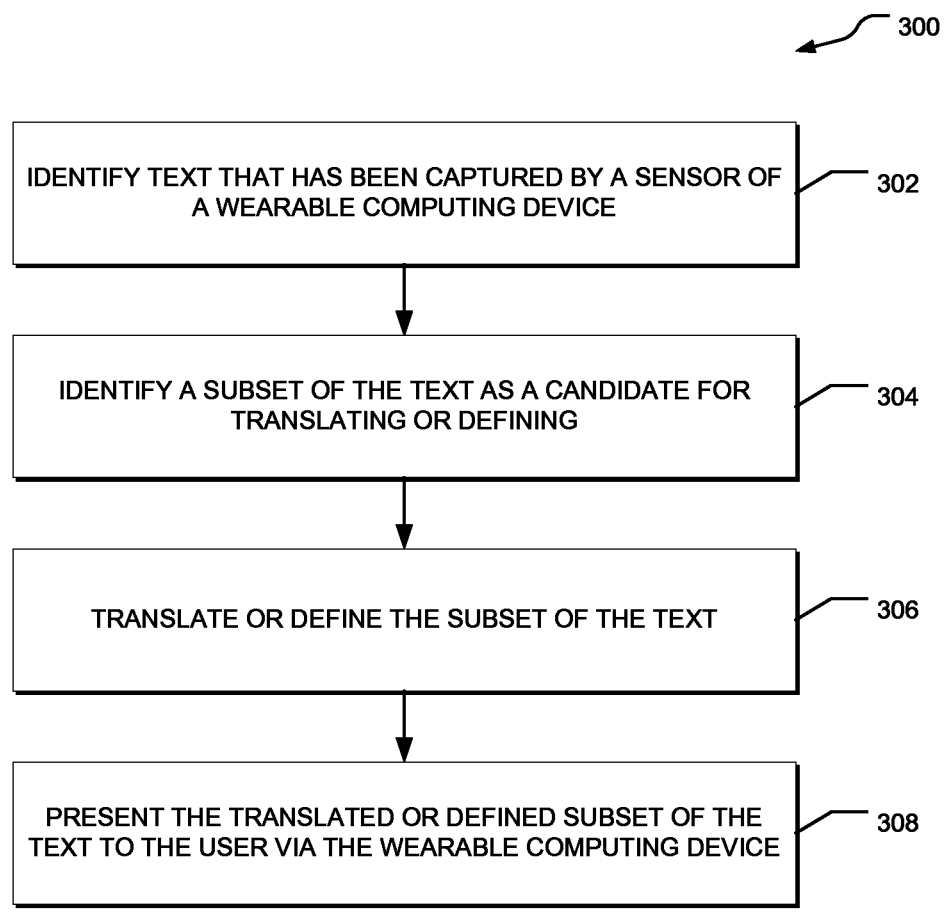
FIG. 3 is a flow chart illustrating example operations of a method of presenting a user of a wearable computing device with a translation or definition of text that is being viewed by the user of the wearable computing device.

FIG. 3 is a flow chart illustrating example operations of a method 300 of presenting a user of a wearable computing device with a translation or definition of a content item. In various embodiments, a sensor of the wearable computing device (e.g., a microphone or camera) captures content item (e.g., audio or text) and presents a translation of the content item to the user. In various embodiments, the translation is presented on a display of the wearable computing device (e.g., on a head-mounted or wrist-mounted display). In various embodiments, the method 300 may be implemented by one or more of the client application(s) 112 or the server application(s) 122.

At operation 302, the monitoring module 202 determines that text has been sensed by a wearable computing device of a user (e.g., via a video or image capturing sensor of the wearable computing device). For example, the monitoring module 202 may scan text over which a sensor (e.g., an optical scanner) of the wearable computing device is placed by the user. Or the monitoring module 202 may detect that text has been captured by a video capturing sensor of the device. Or the monitoring module 202 may detect that the wearable computing device has received a communication that includes text. In various embodiments, the identification of the text by the monitoring module 202 may include applying a text recognition algorithm to an image or image stream being received by the wearable computing device.

At operation 304, the parsing module 202 may identify a subset of that text as a candidate for translating or defining. For example, the parsing module 202 may recognize a subset of the text (e.g., a word or phrase) that is in a different language than the surrounding text. Or the parsing module 202 may identify that the subset of the text is in a language that is not known by the user. For example, the parsing module 202 may query the processing module 254 to determine languages with which the user is familiar. Or the parsing module 202 may determine that the subset of the text includes a technical term or term of art that may not be well-known to the user. For example, the processing module 254 may analyze information stored in the databases 130, 132, or 134 to determine languages or technical areas with which the user may or may not be familiar. For example, the processing module 254 may identify data items stored in a profile of the user that indicate that the user is a native speaker or familiar with particular languages. Or the processing module 254 may identify from behavior of the user (e.g., languages used in messages sent or received by the user or terms that the user uses in sending or receiving communications) that the user is familiar with particular languages or definitions. Or the processing module 254 may identify from a social network of the user (e.g., based on languages known by other users to which the user is connected) that the user is familiar with particular languages. Or the processing module 254 may identify information from information about the user's technical expertise that the user may or may not have an understanding of particular technical terms.

At operation 306, the translation module 206 may determine a translation or a definition corresponding to the subset of the text (e.g., into a language that is known by the user). For example, based on a determination that the subset of the text is in French and the user is familiar with English, the translation module 206 may translate the subset of the text from French to English. For example, if the user is browsing a menu at a restaurant that includes certain menu items that are specified in French, and the user is familiar with the English but not French, the translated text may include English translations of the menu items that are in French. Or based on a determination that the user is not an expert in a particular professional field, the definition module 207 may provide a definition of a term included in the subset of the text that is particular to the professional field. In various embodiments, the translation module 206 or the definition module 207 may simply facilitate communications with the processing module 254 (of the server application(s) 122) and the translating or defining may be entirely or at least partially performed by the processing module 254.

At operation 308, the presentation module 212 may present a translation or definition to the user on the wearable computing device of the user. For example, if the wearable computing device has a head-mounted display, the presentation module 212 may present the English translations of the menu items on the head-mounted display. Or, if the wearable computing device is a smartwatch, the presentation module 212 may present translated or defined text on a display of the smart watch. Or, if the wearable computing device includes an earphone or headphones, the presentation module 212 may present translations or definitions with an audible voice. The presentation module 212 may present the translated or defined text in conjunction with the source of the text, such as an image, audio stream, or video stream. For example, the presentation module 212 may display a visual cue as to the source from which the translated text was identified, thereby enabling the user to associate the translated text with the source of the translatable text.

Figure 4:
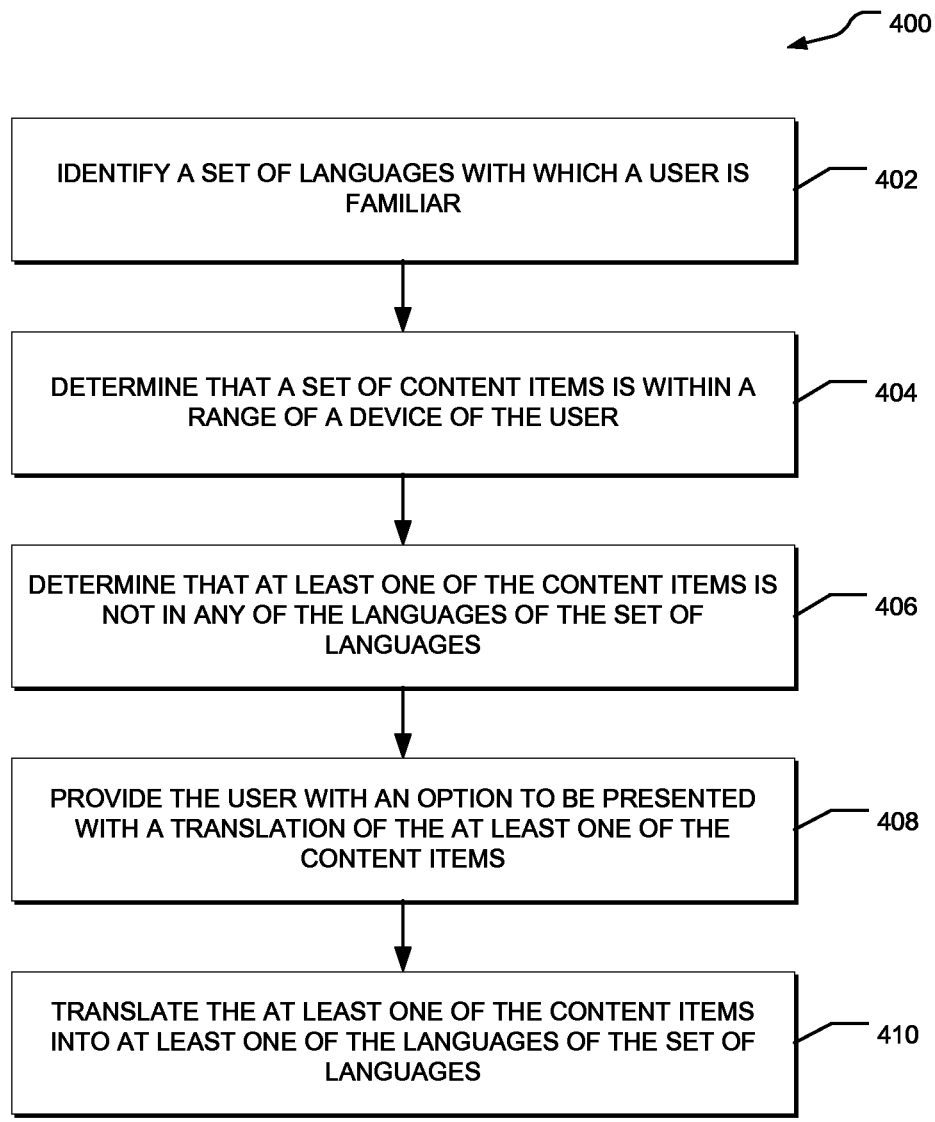
FIG. 4 is a flow chart illustrating example operations of a method of providing a user with an option to receive a translation of a subset of text that is sensed by a wearable computing device of the user.

FIG. 4 is a flow chart illustrating example operations of a method 400 of providing a user with an option to translate a subset of text that is received or detected by a device of the user. In various embodiments, the method 400 may be implemented by one or more of the client application(s) 112 or the server application(s) 122.

At operation 402, the translation module may identify a set of languages with which a user is familiar, as described above with respect to FIG. 3.

At operation 404, the focus module 210 may determine that a set of content items is being focused on by the user. Content items are identifiable parts (e.g., words or phrases) of any kind of content (e.g., video, audio, or textual content) that may be translatable. Examples of content items may include text identified from images or video streams captured by the device. Other examples of content items may include words or phrases identified from utterances in an audio stream captured by the device. The focus module 210 may determine that the set of content items is within the focus of the device based on one or more sensors of the device having detected them (e.g., a camera, video camera, microphone, and so on). Or the focus module 210 may determine that the set of content items is within the focus of the device based on an orientation of the device with respect to one or more sources of the set of detected content items (e.g., based on a sensor data, such as location data, compass data, elevation data, and so on).

At operation 406, the parsing module 204 may determine that at least one of the content items is not in any of the languages of the identified set of languages with which the user is familiar. For example, the device may capture an audio stream (e.g., a radio broadcast) and identify that one or more words or phrases uttered in the audio stream is in a language that is foreign to the user. Or the device may capture a video stream (e.g., a television broadcast or a live recording of the user's surroundings) and identify that one or more words or phrases in the video stream (e.g., subtitles or utterances) are foreign to the user. The determination of whether the content items include words or phrases that are foreign to the user may be based on an analysis of information known about the user (e.g., as described above with respect to FIG. 3).

At operation 408, the presentation module may provide the user with an option to be presented with a translation of the at least one of the content items. For example, the presentation module may notify the user of the device of the detection of translatable content items. The notification may include an indication of a source (e.g., a direction in which the source is relative to the user) or a type of source of the content (e.g., video, audio, textual). The notification may include information pertaining to the language with which a content item is associated as well as options for languages into which the content items may be translated.

At operation 410, based on an acceptance by the user to translate at least one of the content items into a selected language, the translation module may translate the content items. For example, the presentation module 212 may present translations of the words and phrases in substantially real-time to the user in conjunction with a streaming of the content as detected by the device. In various embodiments, the presentation module 212 may continue to present additional translations of words included in the content stream from a particular content source while the device continues to sense or receive output of the content source. In various embodiments, the presentation of the translated content items may be on any of the user interface outputs (e.g., display, headset, microphone, etc.) of the device (e.g., as selected by the user). Thus, for example, a user may have audio content items translated and presented as text on the device or vice versa. In various embodiments, the presentation module 212 may associate a visual cue with the presentation of the translated content items that allows the user to associate the presentation with a source of the content items or a type of the content items (e.g., video, audio, or textual).

Figure 5:
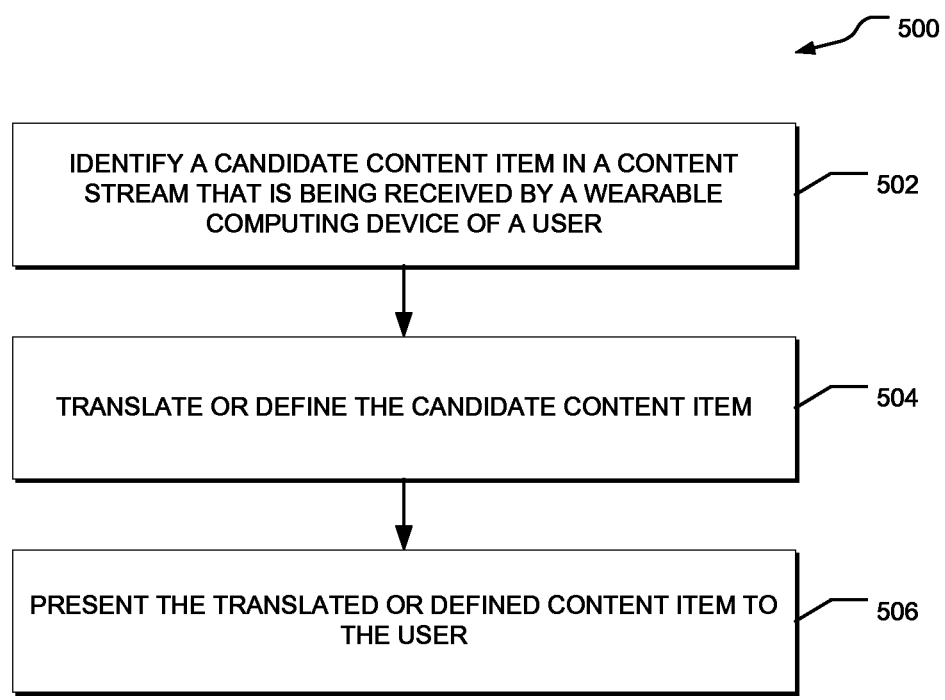
FIG. 5 is a flow chart illustrating example operations of a method of identifying candidate content items in a content stream and presenting translations or definitions of the candidate content items to a user.

FIG. 5 is a flow chart illustrating example operations of a method 500 of identifying candidate content items in a content stream and presenting translations or definitions of the candidate content items to a user. In various embodiments, the method 500 may be implemented by one or more of the client application(s) 112 or the server application(s) 122.

At operation 502, the parsing module 204 identifies a candidate content item in a content stream that is sensed by a device of the user as a candidate content item for translating or defining (e.g., as described above).

At operation 504, the translation module 206 translates the candidate content item or the definition module 207 defines the candidate content item. In various embodiments, the translation of the candidate content item is based on a determination that that content item is in a language with which the user is not familiar or includes a technical term with which the user may not be familiar. In various embodiments, the presentation is performed as described above with respect to FIG. 3 or FIG. 4.

At operation 506, the presentation module 212 presents the translated or defined content item to the user. In various embodiments, the presentation is performed as described above with respect to FIG. 3 or FIG. 4.

Figure 6A:
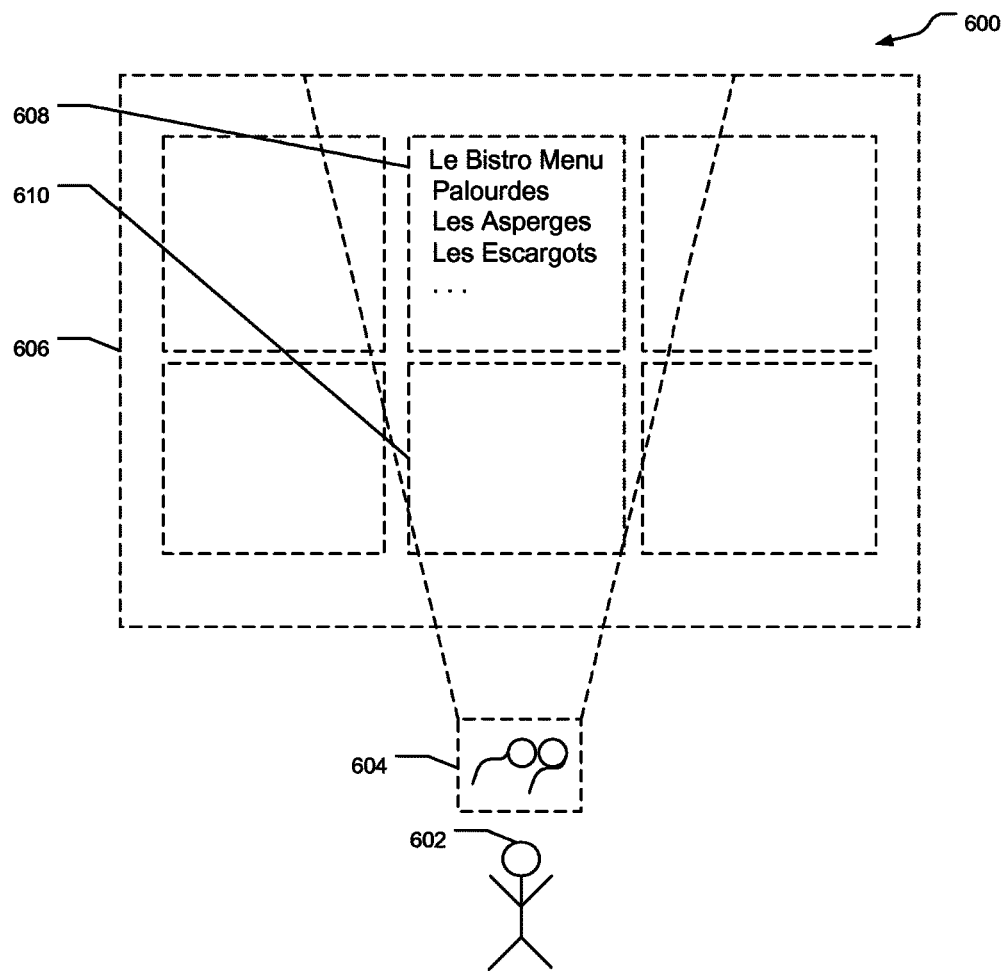
FIG. 6A is a block diagram illustrating a physical environment in which content sources are identified as being in a focus of the wearable computing device and as including one or more content items that are candidates for translating or defining.

FIG. 6A is a block diagram illustrating a physical environment 600 in which content sources 608 and 610 are identified by the device 604 as being in a focus of the device 604 and as including one or more content items that are candidates for translating or defining. As an example, content source 608 may be a document (e.g., a restaurant menu) that is captured by an image-capturing sensor of the device 604 and content source 610 may be a radio or television (e.g., a radio news broadcast) that is captured by a microphone of the device 604. In various embodiments, the content source may be further selected based on a focus of the device (e.g., based on the orientation of the device 604 with respect to the content items 608 and 610). The device 604 may identify that the content source 608 includes one or more French content items and, based on the user being familiar with English but not French, that the one or more French content items are to be translated into English. The device 604 may further identify that the content source 610 includes one or more content items that are utterances of Spanish words or phrases and, based on the user being familiar with English but not Spanish, that the one or more Spanish content items are to be translated into English.

Figure 6B:
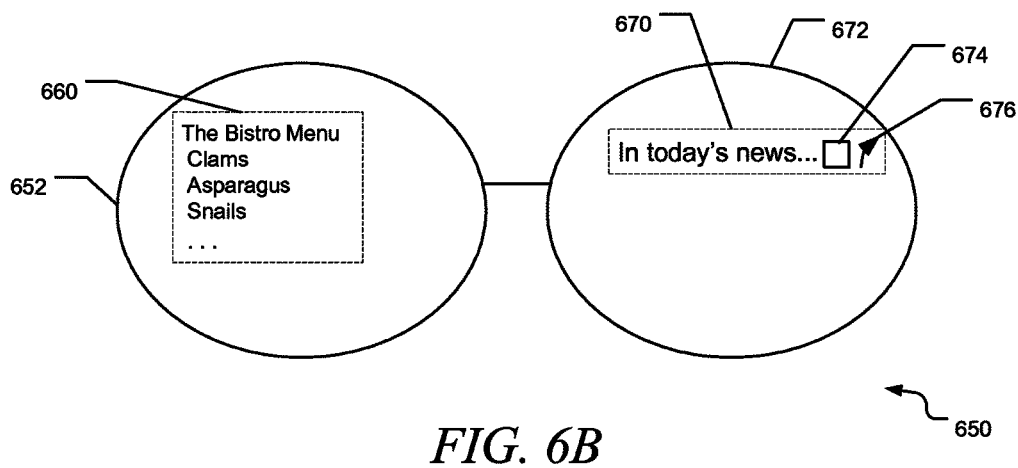
FIG. 6B is a block diagram illustrating a user interface that may be presented on the device shown in FIG. 6A.

FIG. 6B is a block diagram illustrating a user interface 650 that may be presented on the device 604 of FIG. 6A. In various embodiments, a user interface element 660 may be displayed (e.g., on a left head-mounted display 652 of the device 604). The user interface element 660 may include a translation or definition of one or more content items identified as being included in or generated by the content source 608. For example, if the content source is a restaurant menu that includes French words or phrases, and it is determined that the user is familiar with English but not French, the user interface element 660 may include a French-to-English translation of the French words or phrases. The user interface element 660 may be presented on the lens such that it is minimally disruptive to the user, such as in the upper left corner of the lens and with a transparent background. The user interface element may include a visual cue (not shown) that allows the user to determine that the user element 660 is associated with the content source 608.

In various embodiments, a user interface element 670 may be displayed (e.g., on a right head-mounted display 672 of the device 604). The user interface element 670 may include a translation of one or more content items identified as being included in or generated by the content source 610. For example, if the content source is a radio broadcast that includes utterances of Spanish words or phrases, and it is determined that the user is familiar with English but not Spanish, the user interface element 670 may include Spanish-to-English translations of the Spanish words or phrases. Thus, an audio utterance in a language with which a user is unfamiliar may be translated and presented in textual form on a display of the device. Or, in various embodiments, a textual word or phrase may be translated and presented in audio form (e.g., via a headset or speaker phone of the device 604). Thus translations or definitions content items received in one form (e.g., textual form) may be presented to the user in another form (e.g., audio form).

In various embodiments, a visual cue 674 may be presented to help the user identify the source 610 or a type of the source 610 of the translated or defined content item presented in the user interface element 670. Furthermore, a visual cue 676 may identify a direction of the source of the content (e.g., a radio, television, or other source) relative to the physical location or orientation of the device 604.

Figure 7:
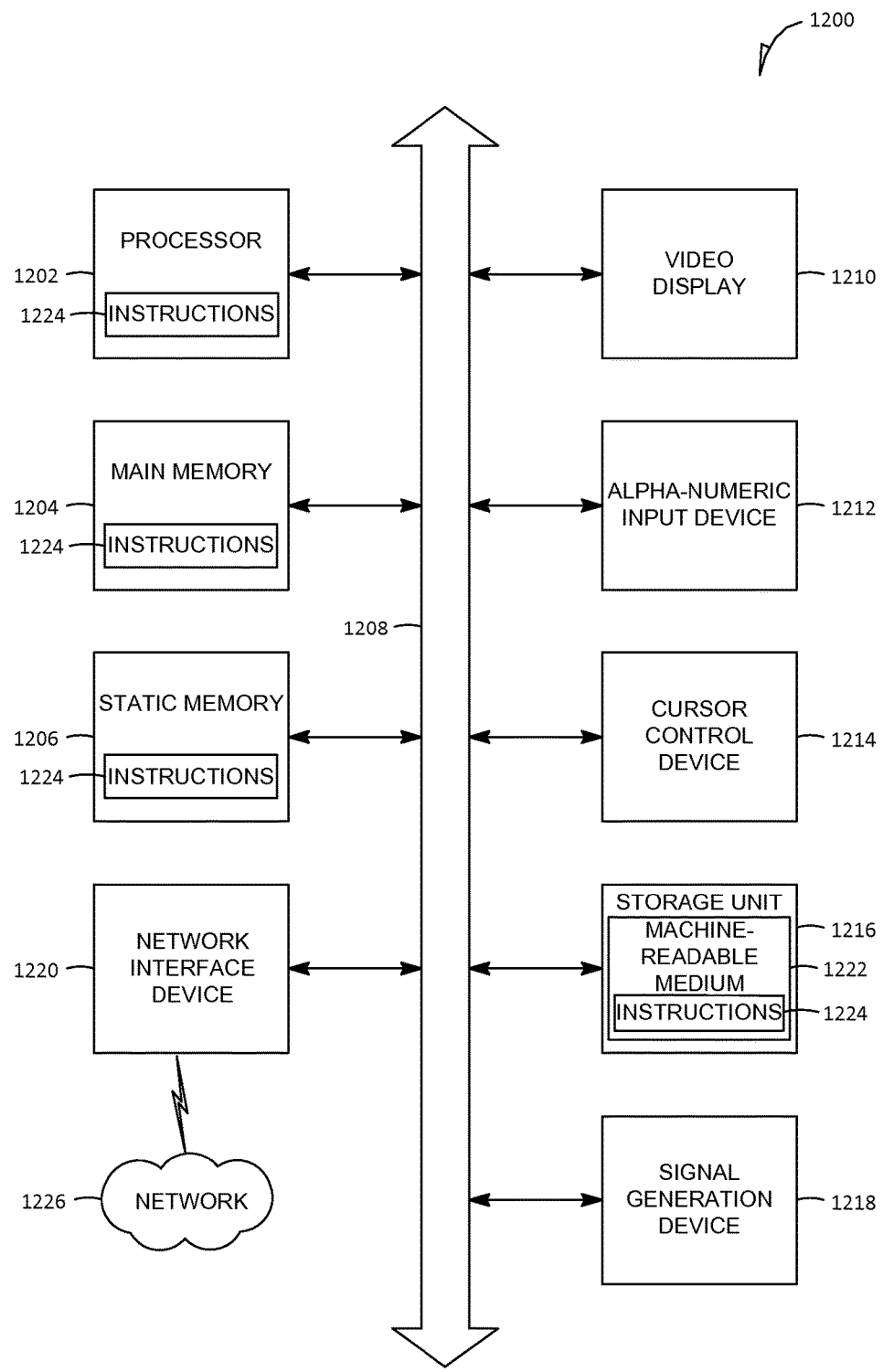
FIG. 7 is a block diagram of a machine in the example form of a computer system within which instructions for causing the machine to perform any one or more of the operations or methodologies discussed herein may be executed.

FIG. 7 is a block diagram of a machine in the example form of a computer system 1200 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation (or cursor control) device 1214 (e.g., a mouse), a storage unit 1216, a signal generation device 1218 (e.g., a speaker) and a network interface device 1220.

The disk drive unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media. The instructions 1224 may also reside, completely or at least partially, within the static memory 1206.

While the machine-readable medium 1222 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

The instructions 1224 may further be transmitted or received over a communications network 1226 using a transmission medium. The network 1226 may be one of the networks 1220. The instructions 1224 may be transmitted using the network interface device 1220 and any one of a number of well-known transfer protocols (e.g., Hyper Text Transfer Protocol (HTTP)). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   detecting that a content item has been captured by a device of a user;
   identifying that the content item is a candidate content item for translation based on an analysis of a profile of the user maintained by the user with respect to a social-networking system, wherein analysis of the profile of the user includes a determination that the user is not proficient in a language of the content item based on information discovered about other users to which the user is connected;
   translating the candidate content item; and
   presenting the translated candidate content item via a user interface of a wearable display of the device, the presenting of the translated content item including presenting a visual cue on the user interface that allows the user to identify a direction of a content source from which the content item was derived relative to an orientation of the device, the presenting of the visual cue based on a determination that the content item is at least partially outside the focus of the device, the presenting of the translated content item being performed by a processor.

2. The method of claim 1, wherein the identifying that the content item is the candidate content item is based on a determination that the user has specified in a profile of the user that content items in a language of the content item are to be translated to a default language.

3. The method of claim 1, further comprising selecting the content item based on an orientation of the device relative to the content source.

4. The method of claim 1, wherein the content item is received from an audio source and wherein the presenting of the translated candidate content item includes presenting a textual translation of the content item via the user interface.

5. The method of claim 1, wherein the candidate content item is a technical term, the analysis of the profile of the user includes a determination that the user does not have technical expertise with respect to the technical term, and the translating of the candidate content item includes defining the technical term.

6. The method of claim 5, wherein the determination that the user does not have technical expertise with respect to the technical term is based on an employment history of the user.

7. The method of claim 1, the presenting of the translated content item further including presenting an additional visual cue on the user interface that allows the user to identify a type of the content source from which the content item was received.

8. The method of claim 1, wherein the presenting of the visual cue is based on a determination that the content source is not in a field of vision of the device.

9. The method of claim 1, wherein the presenting of the visual cue is further based on a type of the source of the content item being a non-visual type.

10. A system comprising:
one or more processors and a computer-readable medium having instructions stored thereon, which, when executed by the one or more processors, cause the system to, at least:
detect that a content item has been captured by a device of a user based on an analysis of a profile of the user maintained by the user with respect to a social-networking system, wherein the analysis of the profile of the user that the user includes a determination that the user is not proficient in a language of the content item based on information discovered about other users to which the user is connected;
identify that the content item is a candidate content item for translation;
translate the candidate content item; and
present the translated candidate content item via a user interface of a wearable display of the device, the presenting of the translated content item including presenting a visual cue on the user interface that allows the user to identify a direction of a content source from which the content item was derived relative to an orientation of the device, the presenting of the visual cue based on a determination that the content item is at least partially outside the focus of the device.

11. The system of claim 10, wherein the identifying that the content item is the candidate content item is based on a determination that the user has specified in a profile of the user that content items in a language of the content item are to be translated to a default language.

12. The system of claim 10, wherein the at least one module is further configured to select the content item based on an orientation of the device relative to the content source.

13. The system of claim 10, wherein the content item is received from an audio source and wherein the presenting of the translated candidate content item includes presenting a textual translation of the content item via the user interface.

14. A non-transitory machine readable medium embodying a set of instructions that, when executed by a processor, cause the processor to perform operations, the operations comprising:
detecting that a content item has been captured by a device of a user;
identifying that the content item is a candidate content item for translation based on an analysis of a profile of the user maintained by the user with respect to a social-networking system, wherein the analysis of the profile of the user that the user includes a determination that the user is not proficient in a language of the content item based on information discovered about other users to which the user is connected;
translating the candidate content item; and
presenting the translated candidate content item via a user interface of a wearable display of the device, the presenting of the translated content item including presenting a visual cue on the user interface that allows the user to identify a direction of a content source from which the content item was derived relative to an orientation of the device, the presenting of the visual cue based on a determination that the content item is at least partially outside the focus of the device.

15. The non-transitory machine readable medium of claim 14, wherein the identifying that the content item is the candidate content item is based on a determination that the user has specified in a profile of the user that content items in a language of the content item are to be translated to a default language.

16. The non-transitory machine readable medium of claim 14, the operations further comprising selecting the content item based on an orientation of the device relative to the content source.

17. The non-transitory machine readable medium of claim 14, wherein the content item is derived from a content stream being played by the content source and the translating and presenting is performed substantially in real-time in conjunction with the playing of the content source.

* * * * *